United States Patent [19]
Wilson

[11] Patent Number: 5,774,597
[45] Date of Patent: Jun. 30, 1998

[54] IMAGE COMPRESSION AND DECOMPRESSION USING OVERLAPPED COSINE TRANSFORMS

[75] Inventor: Dennis L. Wilson, Palo Alto, Calif.

[73] Assignee: GE Medical Systems, Inc., Milwaukee, Wis.

[21] Appl. No.: 523,767

[22] Filed: Sep. 5, 1995

[51] Int. Cl.[6] .............................. G06K 9/36; G06K 9/46
[52] U.S. Cl. ...................... 382/250; 382/268; 348/403; 358/433
[58] Field of Search .................................. 382/248, 250, 382/268, 232, 233, 249; 358/432, 433; 348/395, 400, 403, 420

[56] References Cited

U.S. PATENT DOCUMENTS

| | | | |
|---|---|---|---|
| 4,754,492 | 6/1988 | Malvar | 358/433 |
| 5,455,874 | 10/1995 | Ormsby et al. | 358/433 |
| 5,495,538 | 2/1996 | Fan | 358/433 |
| 5,510,841 | 4/1996 | Iwamura | 348/420 |

Primary Examiner—Leo Boudreau
Assistant Examiner—Bhavesh Mehta
Attorney, Agent, or Firm—Kenneth W. Float

[57] ABSTRACT

An image processing apparatus and method that completely removes blocking artifacts from a compressed and restored digitized image. A compressed image is formed by windowing pixel data with a smooth window (discrete cosine transform) and then folding (wrapping) the windowed pixel data to form a modified image that is the same size as the original image. The wrapped and folded image is thereafter processed using a conventional discrete cosine transform and coder to produce the compressed image. To restore the original image, an inverse discrete cosine transform is used to process the compressed image, then the pixel data is unfolded (unwrapped), windowed, and combined to form the restored image. The present invention may be used to process data, such as voice signals, and images other than radiological images. The transform used in the present invention may also be a Fourier transform, for example.

12 Claims, 2 Drawing Sheets

IMAGE COMPRESSION AND DECOMPRESSION USING OVERLAPPED COSINE TRANSFORMS

BACKGROUND

The present invention relates generally to image compression apparatus and methods, and more particularly, to image compression apparatus and methods that completely remove blocking artifacts from compressed and restored digitized images and that use a lapped cosine transform to smoothly combine adjacent blocks of the image.

The Joint Photographic Experts Group (JPEG), one of the International Standards Organization (ISO) technical groups, has developed a standard for compressing digitized still images. The procedures used in the JPEG standard are described in "JPEG Still Image Data Compression Standard", by William B. Peanebaker et al, Van Nostrand Reinhold, New York, N.Y., 1993. The basic procedure for implementing lossy compression involves blocking a digitized image into 8×8 pixel blocks, transforming the 8×8 pixel blocks using a discrete cosine transform in two dimensions, and encoding the 8×8 pixel blocks using a Huffman encoder or arithmetic encoder.

The JPEG standard has a number of compression variations including lossless compression, several different kinds of entropy encoding, and sequential, progressive, and hierarchical modes. The sequential mode provides components of each pixel in a block of pixels in sequence. The progressive mode provides coefficients of the discrete cosine transform in groups to provide for a low resolution image that may be improved by adding higher frequency components. The hierarchical mode permits the image to be transmitted in stages with low resolution stages as "predictors" for subsequently transmitted higher resolution stages.

The image produced by JPEG coding is satisfactory for printed pictures that are viewed from a distance. When the images contain many pixels, blocking artifacts of the image are not particularly visible. However, for medical applications, a radiologist may use a magnifying glass to examine a particular area of an image on film in detail. The use of the magnifying glass makes the blocking artifacts of a JPEG compressed image very visible. When an image is expanded so that the 8×8 blocks used in the compression have an appreciable size in the image, the blocking artifacts are visible without a magnifying glass.

A digitized image may also be viewed on a computer workstation screen. The use of a computer permits a viewer to implement a software magnifying glass to view the digitized image. The viewer may also "window" and "level" the image, adjusting the contrast and brightness of the image so that a selected portion of the dynamic range of the intensity of the image may be seen. For images that are manipulated by a computer, the blocking artifacts in a JPEG compressed image are typically visible, and may interfere with diagnosis and treatment of patients, for example. In other applications, the presence of the blocking artifacts can be disturbing as well.

An image may be processed to improve the quality of the image for viewing on a computer workstation screen. The processing can involve edge enhancement, "unsharp masking", and other modifications of the frequency content of the image to enhance viewing of the image. For example, mammography images are typically high pass filtered to make microcalcifications that are an indicator of breast cancer more visible. Unsharp masking is used on many images to highlight details present in the high frequency content of the images.

However, processing JPEG images using edge enhancement and other filtering processes is counterproductive. The blocking artifacts that are present in the image are enhanced until they dominate the image. The presence of desired elements in the image are obscured by the enhanced blocking artifacts, and the processed image is nearly useless after compression and decompression have been performed.

U.S. Pat. No. 5,289,548 assigned to the assignee of the present invention discloses a technique for reducing the blocking artifacts of a JPEG compressed image. This technique decomposes the image into a low frequency image and a high frequency image formed by subtracting the low frequency image from the entire image. Because the low frequency image has a very much reduced spatial frequency, the image can be downsampled, and a downsample by a factor of four was suggested. Encoding of the downsampled image uses very few bits, since the image has a factor of 16 fewer pixels, and a simple entropy encoder achieves another factor of three in compression, resulting in a downsampled image representation that is a factor of 40 smaller than the original image. The difference between the original image and the low frequency image is encoded using an 8×8 discrete cosine transform in a manner similar to JPEG processing. This high frequency image has an adaptive quantization that concentrates the encoded bits where they are most visible in a local area with a local dynamic range.

The use of a low frequency image and a high frequency image reduces the blocking artifacts quite strongly. The DC component and several of the low frequency AC components of the image are removed from the high frequency image before it is transformed. Discontinuities resulting from the low frequency components are removed, leaving only the high frequency components to generate sharp discontinuities that are characteristic of the blocking artifacts. In a large part of a typical image, the blocking artifacts cannot be seen even under gross magnification or contrast enhancement. However, with nominal compression ratios of 10:1, the blocking artifacts become visible in areas of high dynamic range, such as areas around staples or tubes in an X-ray image of a patient. These artifacts are due to the large high frequency content of the image in the vicinity of the sharp edges. These artifacts are removed from the image by the present invention.

Another technique for image decomposition uses lapped orthogonal transforms. With this technique, the image is decomposed into separate frequency cells using overlapped blocks. When the blocks ere overlapped, the edge effects can be reduced or eliminated.

Accordingly, it is an objective of the present invention to provide for image compression apparatus and methods that that completely remove blocking artifacts from compressed and restored images. It is a further objective of the present invention to provide for image compression apparatus and methods that use a lapped cosine transform to smoothly combine adjacent blocks of the image, which results in the elimination of the blocking artifacts from compressed and restored images. A further objective of the present invention is to provide for a lapped cosine transform that is compatible with existing JPEG compression apparatus.

SUMMARY OF THE INVENTION

To meet the above and other objectives, the present invention provides for an image processing apparatus and method that completely removes blocking artifacts from a compressed image by windowing pixel data with a smooth window (discrete cosine transform) instead of a square window used in normal JPEG compression. The present apparatus and method then folds (wraps) the windowed pixel data to form a modified image that is the same size as the original image, which image is thereafter processed using a conventional discrete cosine transform that is normally used in JPEG compression. To restore the image, an inverse discrete cosine transform is used to process the compressed image, then the pixel data is unfolded (unwrapped), windowed, and combined to form the restored image.

The process of windowing and folding the pixel data adds only a small amount of complexity to the compression process and may be implemented in a pipelined processor with very little compromise with respect to the speed of compression. Similarly, decompression may be implemented in a pipelined processor that is nearly as fast as a normal JPEG processor. The hardware that performs the JPEG compression may be used directly in the compression of images with the present invention.

The present invention may also be used to process data other than radiological images, and is not limited in this respect. The data that is processed may be any type of image or may be one dimensional data such a voice signal derived from a microphone, for example. Further, the transform used in the present invention is not limited to a cosine transform, and other transforms may be used. For example, in a modified form, a Fourier transform has the same properties as a cosine transform, and image or voice data may be windowed and wrapped to form a block that is processed with a fast Fourier transform, for example.

BRIEF DESCRIPTION OF THE DRAWINGS

The various features and advantages of the present invention may be more readily understood with reference to the following detailed description taken in conjunction with the accompanying drawings, wherein like reference numerals designate like structural elements, and in which.

DETAILED DESCRIPTION

Figure 1:
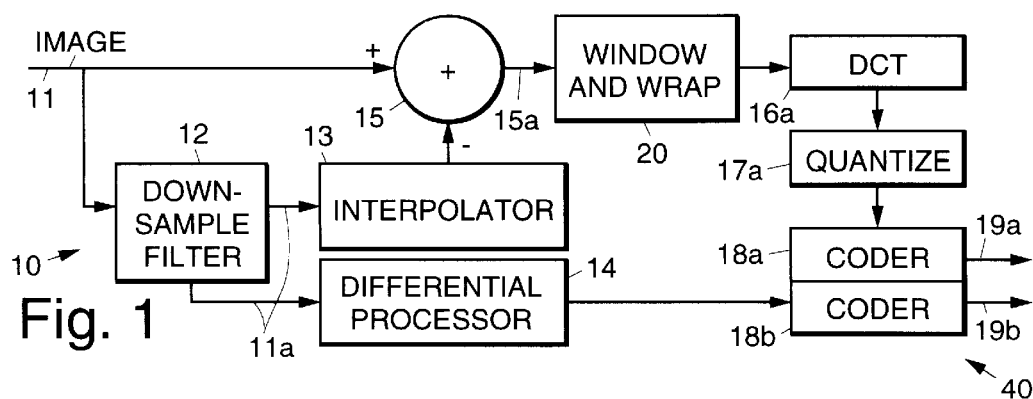
FIG. 1 illustrates an image processing apparatus and method for compressing an image in accordance with the principles of the present invention.

Referring to the drawing figures, FIG. 1 illustrates an image processing apparatus 10 and method 40 for compressing digitized data 11, such as an image 11, in accordance with the principles of the present invention. The compression apparatus 10 and method 40 decomposes the data 11 or image 11 into a high frequency component and a low frequency component. The low frequency component is downsampled (low pass filtered) in a downsample filter 12 based on the low frequency content of the data or image 11 to form a low pass filtered image 11a (or data 11a). The low pass filtered data or image 11a is restored in an interpolator 13 and subtracted from the input image or data in a summing device 15 to form a difference image 15a (difference data) that comprises a high frequency image 15a. The difference image 15a or high frequency image 15a is transformed using a modified smooth discrete cosine transform 20 in accordance with the present invention in the manner discussed below. The coefficients of the modified discrete cosine transform 20 are discrete cosine transformed 16a, quantized 17a, and then encoded for transmission in a first coder 18a. The low pass filtered image 11a (or data) is quantized in a differential pulse code modulation (DPCM) processor 14 or differential processor 14 and encoded for transmission in a second coder 18b. Outputs of the first and second coders 18a, 18b provide an encoded compressed image 19a, 19b (or encoded compressed data 19a, 19b), which may be transmitted or archived.

Control of the quality of the image 11 or data 11 is performed locally. For each discrete cosine transform block, quantization 17a may be selected independent of other discrete cosine transform blocks. The local control allows for a number of different affects of the image 11 to be controlled, including constant bit rate across the image 11, constant manipulated viewing window, and the like. Control of constant bit rate was developed more than 15 years ago. The quantization 17a is controlled according to the "energy" in the block, allocating more bits to blocks with higher energy.

Control of a normalized viewing window is an artifact of viewing the image 11 on an electronic workstation. On a workstation, the image 11 may be magnified, windowed and leveled. The magnification reduces the area that is seen to a local area. The window and level functions adjust the portion of the dynamic range that can be viewed. For an area with locally low dynamic range, a smaller window may be used with the level adjusted around the average value in the viewing area. The result is that the local view will not include the whole image, but only the local area with a local dynamic range. Where the dynamic range is reduced, there should be more bits allocated to permit viewing the details of the dynamic range that is present. Where the dynamic range is large, the same number of bits can be allocated across the increased dynamic range, reducing the detail in dynamic range to correspond to what is viewed locally.

The constant bit rate and normalized viewing controls have the opposite effect on the number of bits that are used, with the normalized viewing control increasing the number of bits used while the constant bit rate control decreases the number of bits used when the dynamic range is high in a local area.

Psycho-physical weighting of the quantization 17a is used, as in JPEG compression. Higher frequencies are quantized more coarsely, since the eye is less sensitive to noise at higher frequencies.

The block size of the discrete cosine transform 20 uses 8×8 pixels so that it is compatible with existing JPEG software and hardware. The present invention may be implemented using JPEG software and hardware that have already been developed.

Figure 2:
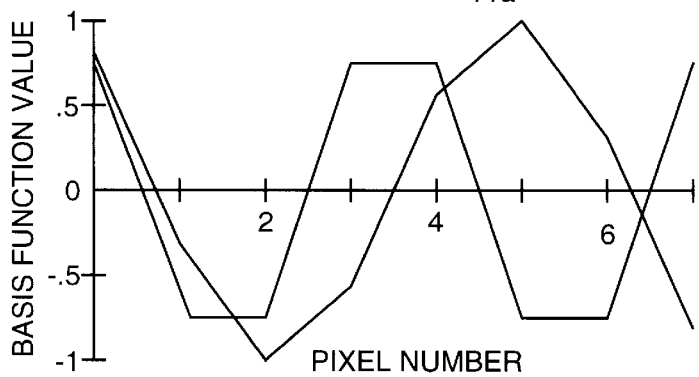
FIG. 2 shows third and fourth basis functions for an 8 point discrete cosine transform used in the apparatus and method of FIG. 1.
Figure 3:
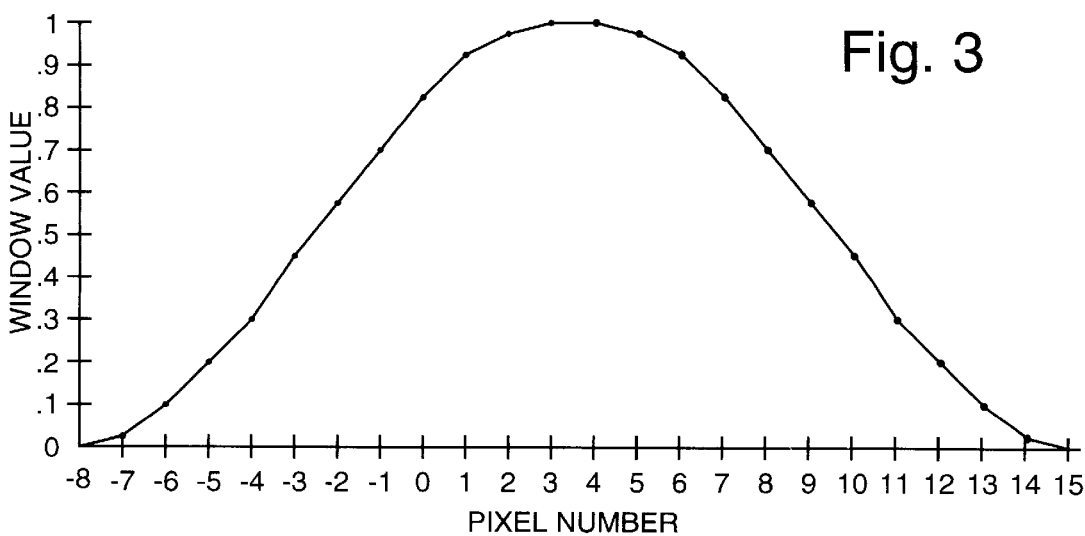
FIG. 3 illustrates a window or cosine weighting function used in the apparatus and method of FIG. 1.

The modified discrete cosine transform 20 uses cosines as basis functions for the transform. FIG. 2 shows third and fourth basis functions for an 8 point discrete cosine transform 20 that may be employed in the present invention. The transformation that is used is a windowed discrete cosine transform 20. The window spans three blocks. The nature of the window is shown in FIG. 3. The area represented in FIG. 3 is the center block with pixels from 0 to 7. The window spans the pixels from −8 to 15 to form a filter with reduced sidelobes. The window is applied to pixel data of the image 11 by a point by point multiplication of the pixel value times the window value. When sidelobe frequencies are controlled, the energy of the processing is restricted in frequency, permitting more control of aliasing.

One weighting function that may be used in the present invention is the particular cosine weighting function shown in FIG. 3. Other weighting functions or windows well-known in the design of digital filters that may be employed in the present invention include Hanning windows, Hamming windows, and Kaiser windows.

Figure 4:
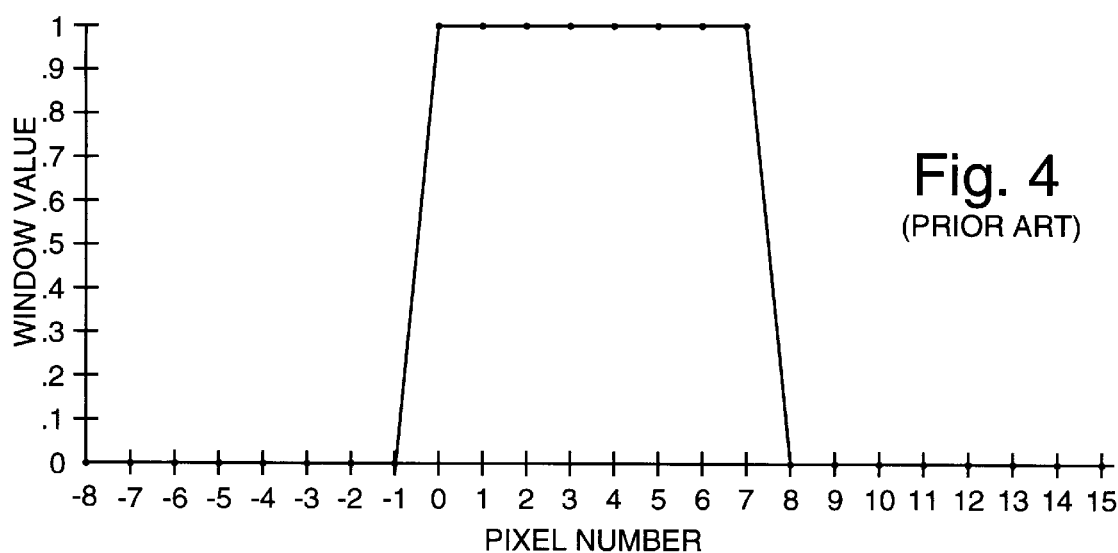
FIG. 4 illustrates a square window or square cosine weighting function used in conventional JPEG compression.

Another weighting function or window is a square window shown in FIG. 4. The square window limits the range of pixels to just the center block and corresponds to standard JPEG weighting. This weighting is not recommended for use in the present invention, since it results in well-known blocking effects that are undesirable in medical images and other images that are viewed on a workstation or on film. For example, when the image is edge-enhanced, the blocking effects can be very prominent.

Figure 5:
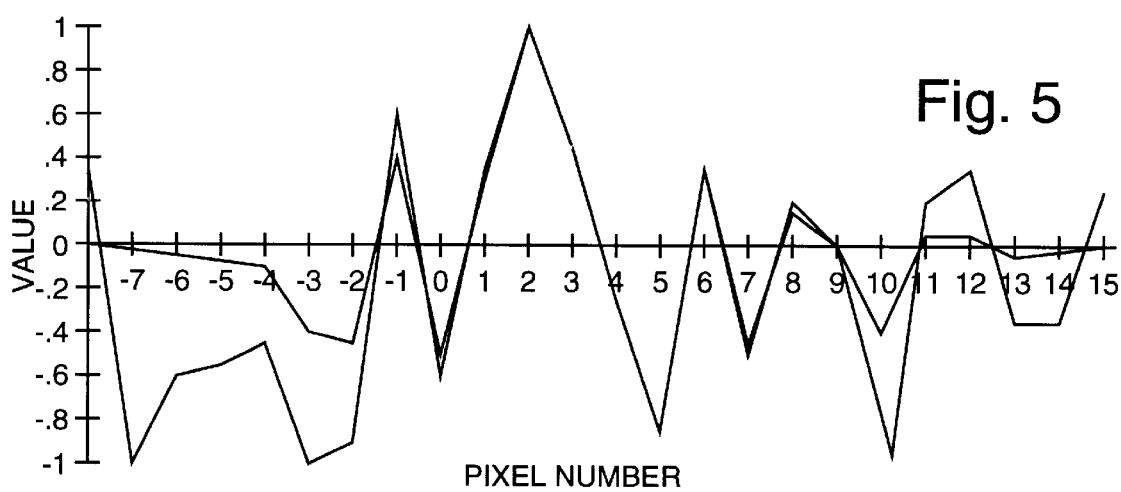
FIG. 5 shows a random difference image block along with a weighted difference image block.

FIG. 5 shows a random difference image block along with a weighted difference image block. The window reduces the amplitude of the block at the edges of the block. This weighting or windowing of the data confines the energy in a cosine transform coefficient to a smaller effective bandwidth, allowing more effective downsampling with reduced aliasing effects. The aliasing effects generate the objectionable blocking artifacts in conventional JPEG compression.

The use of a window with a discrete cosine transform makes possible the utilization of available JPEG hardware and software. A windowed block covering 24 pixels may be reduced to an 8×8 pixel block by folding, which is a key aspect of the present invention. The basis vectors of the discrete cosine transform across the 24 pixels are folded at the boundaries of the 8×8 pixel block. That is, the cosine function that is one of the transform basis vectors will fall on itself when folded at the boundaries of the 8×8 pixel block.

Mathematically, $\cos[\{(-2x)-1\}(u\pi/16)] = \cos[(2x+1)(u\pi/16)]$ for x=0 to 7 and u=0 to 7, since $\cos(x) = \cos(-x)$. Similarly, $\cos[2(15-x)-1](u\pi/16)] = \cos[(2x+1)(u\pi/16)]$ for x=0 to 7 and u=0 to 7, since $\cos(2x) = \cos(2(15-x))$ when the span is 16.

Figure 6:
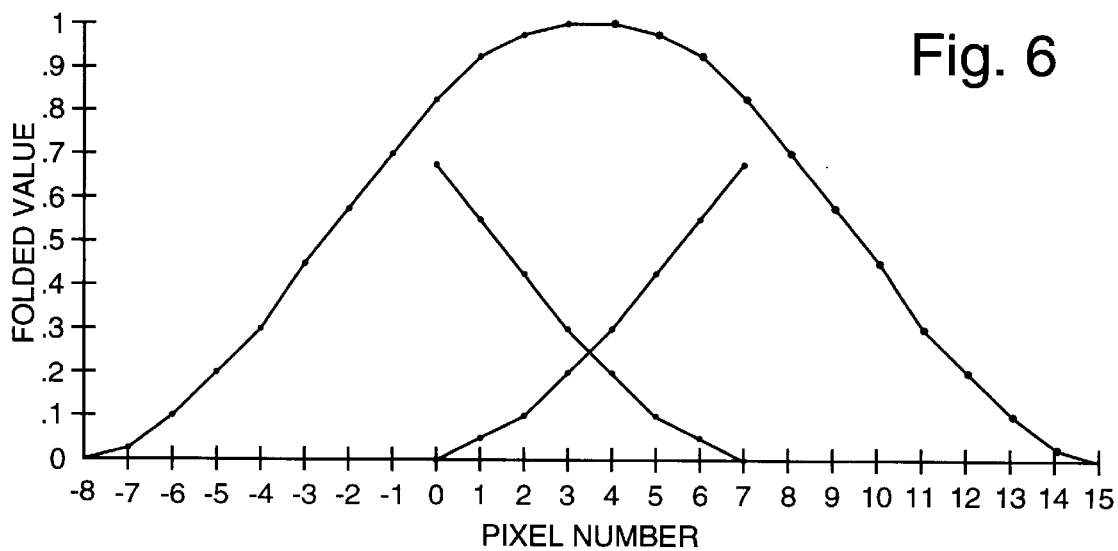
FIG. 6 shows an 8 point data block employed in the apparatus and method of FIG. 1.

Given the above, an 8 point data block may be formed as shown in FIG. 6. The windowed data is folded about the end points of the interior block and added to the interior block. By extension, a two dimensional discrete cosine transform 20 may be formed by folding the data in the second dimension which results in folding the transformed data and applying the discrete cosine transform in the second dimension. However, the folding process and the transform commute as has been discussed above. The result is that a folded block that is 8×8 can be formed from the windowed block of data that is 24×24. The folded 8×8 block is processed with the two dimensional discrete cosine transform 20. Alternatively, any hardware that performs the 8×8 discrete cosine transform may be used to implement the computation.

In simplified form, the processing of the high frequency image 15a using the present invention forms data blocks by overlapped windowing the data and folding the data to an 8×8 block. The aggregation of windowed, folded 8×8 blocks forms a processed image that may be compressed using a conventional discrete cosine transform 16a used in JPEG compression.

The coefficients that are formed using the 8 point discrete cosine transform 20 are then processed to provide discrete cosine transform compression. The steps are to apply a local quantization and frequency weighting. In JPEG terms, this means to apply a frequency weighted quantization. The quantization matrix may be the same for all of the blocks or may be different for each block. A variable quantization may be selected from a small set (4) of quantization matrices. A 2 bit number may be used to indicate the selected quantization matrix.

Next, the data is encoded using an extended Huffman coder, for example. Since the size of the data blocks has been controlled by deleting the low frequency content and by controlling the quantization, only one Huffman coder is required. The extended Huffman coder includes encoding runs of zeroes as elements of its coding table. In the alternative, an adaptive encoder may be used, such as an approximate RICE encoder. In this adaptive encoder, the "energy" in a block of 16 coefficients in "zigzag" order is measured. The value of the next sample is encoded by assuming that the value is a Gaussian random variable with variance equal to the energy of the previous sixteen samples. In another alternative, the number of coefficients that are enclosed may be limited by supplying a number between 0 and 63 that is the number of coefficients retained in the zigzag ordering. All coefficients after the number supplied are zeroed and need not be sent.

Next, a message is formatted for the compressed data set. The message includes an indicator for the type of encoding that is used, a set of four quantization tables, a Huffman coding table, and the data for each of the blocks. The data for a block includes a number indicating which of the quantization tables is to be used, a number indicating the number of retained coefficients, and the quantized, encoded values of the discrete cosine transform coefficients in zigzag order. This completes the compression process.

Figure 7:
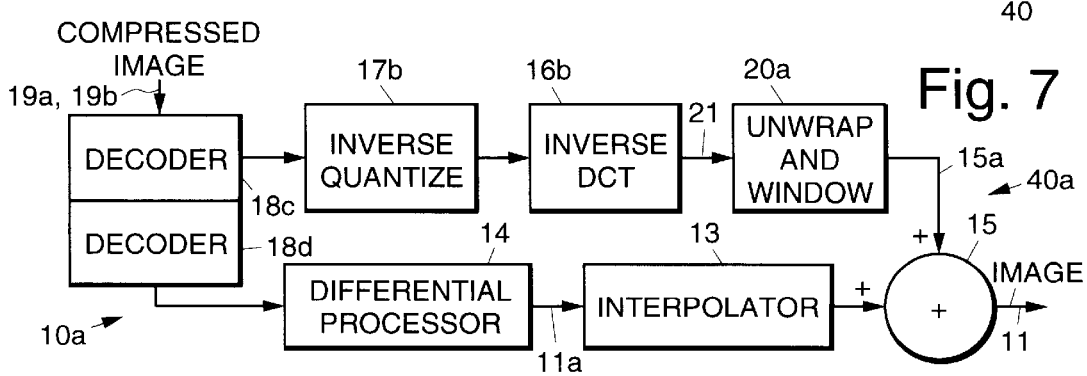
FIG. 7 illustrates an image processing apparatus and method for decompressing an image in accordance with the principles of the present invention.

The decompression apparatus 10a and method 40a is similar to the compression apparatus 10 and method 40 described above. The decompression apparatus 10a and method 40a is shown in FIG. 7. The process begins by following the JPEG process for decompressing the image. The process begins by decoding the image 19a in a first decoder 18c and restoring the quantization of the frequency coefficients of the discrete cosine transform by inverse quantization 17b to remove the effects of the quantization step on the amplitudes of the coefficients. For medical images, more than one quantization matrix is used, so the inverse of the matrix that applies to the particular block is used. The discrete cosine transform blocks of the compressed image 19a are transformed using a conventional inverse discrete cosine transform 16b to restore the image components. The transformation using the conventional inverse discrete cosine transform 16b produces wrapped pixel values 21 for high frequency components of the image 11.

The pixel values are then processed in accordance with the present invention to unwrap and window the data. The pixel values are unwrapped by inverting the order of the signals and appending the blocks to the left, right, above and below the block, and then applying the window used in the compression apparatus 10 and method 40 to the extended block. The eight pixels in one row of the block is extended by unwrapping the block in the same manner that it was wrapped to form rows that are 8×3=24 pixels long. The unwrapping is performed by reversing the direction of the block and appending the reversed block on the right and on the left of the raw transformed block. Similarly, the blocks are reversed vertically, and appended above and below the raw transformed block. The result is then windowed using the window used in the compression apparatus 10 and method 40. Each row is multiplied by the window. After the window is applied to the rows, it is applied to the columns. The windowed extended block is added back to the reconstructed high frequency image 15a using a summing device 15, adding the overlapping segments to the adjacent blocks to form the high frequency image 15a.

Once the high frequency image 15a is complete, the low frequency image 11a is reconstructed. The low frequency image 11a is decoded in a second decoder 18d comprising a Huffman decoder 18d corresponding to the Huffman coder 18b that was used for compression. The decoded data is passed through a differential pulse code modulation (DPCM) processor 14 or differential processor 14 to remove the effects of local differences. The result is a downsampled image that corresponds to the low frequency image 11a that was originally encoded. The downsampled image may also be used as a low resolution version of the image 11.

The low frequency image 11a is combined with the high frequency image 15a to form the complete image 11 by upsampling the low frequency image using an interpolator 13 in the same way as was done during compression and adding the two images 11a, 15a using the summing device 15. Since The low frequency image 11a is lossless compressed and the upsampling process is exactly the same as was performed during compression, the low frequency content of the image 11 has been lossless compressed, while the high frequency content of the image 11 has been lossy compressed.

The last step to achieve decompression of the image 11 is to ensure that no pixel has an intensity less than zero.

The present invention may be extended by applying the procedure to the low pass image. This second application reduces the size of the compressed image by a small amount. The first application of the low pass filtering reduces the size of the compressed low pass filtered image 19a, 19b to a factor of approximately forty times smaller than the original image 11. With this limitation, a total compression factor of twenty is a useful lower limit on the compression achieved with half of the bits allocated to the low pass filtered image 19b and half allocated to the high pass filtered image 19a. Higher compression may be achieved with a second application, but the quality of the decompressed image is relatively low.

The compression apparatus 10 and method 40 provides for image preprocessing that subtracts out the low frequency content of the image 11, leaving the high frequency image for lossy compression. The low pass filtering and downsampling employed in the present invention is well understood in the art and may be performed using available software and hardware. Additional preprocessing is performed to window and wrap the pixels of 8×8 blocks of pixels. This preprocessing is also relatively easy to execute, requiring 324 multiplies and 256 adds for each 8×8 block of pixels.

The resulting preprocessed image is processed for compression as though it were a JPEG image. The use of a selected quantization matrix with each block makes the present invention different from standard JPEG. The selection of only one quantization matrix would make the processing exactly like JPEG processing. The JPEG discrete cosine transform processing has been carefully studied to provide for the highest speed computation with the least amount of computation. The present invention takes advantage of this by making the same discrete cosine transform algorithms appropriate for the discrete cosine transform processing.

On decompression, the processing starts with standard JPEG processing with the exception of the selection of the quantization matrix for each block. Processing proceeds through the inverse discrete cosine transform to form a wrapped high frequency image. The process of unwrapping and windowing the image is a departure from conventional JPEG processing, but is easily performed with available hardware and software.

The present invention can remove all of the objectionable qualities of JPEG compression. In particular, careful windowing of the blocks completely removes edge artifacts. The windows are, in effect, anti-aliasing filters that properly filter the pixels for downsampling instead of using a simple square window as in conventional JPEG compression.

The present invention has a degenerate mode that is the same as JPEG compression. If the window is a simple square window, there is only one quantization matrix, and the low pass image is not extracted, and the resulting compression is JPEG compression. The restoration may be performed using available JPEG hardware and software. If necessary, a conversion routine can change the format of the compressed image so that it is exactly the JPEG format.

When the size of the blocks is reduced to 2×2 from 8×8, the present invention degenerates to wavelet encoding. If this is incorporated into the present invention, an expanded quantization matrix must be used, since the frequency components are spread over a much larger block of the compressed data set. However, while including wavelet compression is straight forward simply by permitting the 2×2 blocks, it is not recommended for reasons of compatibility with JPEG.

The present invention provides for high compression ratios. The target compression ratio of typical X-ray images is between 10:1 and 20:1. While there is provision for higher compression ratios, the quality of the displayed images are degraded at higher ratios. The present invention provides for psycho physically-based quantization, wherein frequency dependent quantization is used in a manner similar to JPEG compression. The present invention provides for local adaptivity of quantization and/or source coding based on criteria determined by the designer. The present invention provides for efficient coding of low-entropy images. The mechanism for low entropy encoding may use variable length source words to encode strings of zeroes as in JPEG compression. The present invention provides for picture decomposition attributes, including overlapping basis functions and hierarchical decomposition, and the like. The image is decomposed into a high frequency imager and a downsampled low frequency image. The low frequency image may be used as a low resolution image in a segmented transmission scheme.

The present invention provides for superior tolerance to post-processing, including edge enhancement and the like, in that it is difficult to tell the difference between post-processing the original image and post processing he decompressed image because the compression does not introduce edges. The present invention removes visually annoying artifacts, particularly at low bit rates. The present invention has a relatively low overall complexity and implementation cost, and may be a simple addition to a JPEG compression processor. The present invention requires about 100 percent more computation than JPEG compression, but is relatively fast if pipelined a processor are employed. A primary advantage of the present invention is that hardware and software is readily available to execute it. The present invention has low sensitivity to input image variations. The present invention is very robust in the presence of noise. Errors in the presence of additional noise in the image have little effect, and the present invention does not tend to enhance noise in the image. The present invention is applicable to a wide range of imaging modalities. The primary sensitivity to the image type is in the quantization matrix, which may be tailored for a particular image type or for a particular image, if desired. The use of an approximate Rice encoding removes this dependence.

The compression and compression techniques described in U.S. Pat. No. 5,289,548 are adequate for archiving of historical images not used for primary diagnosis. The windowed transform of the present invention removes substantially all blocking artifacts from JPEG compressed images, resulting in images that may be archived and later used for primary diagnosis.

Thus, the present invention provides an improvement to the compression technique described in U.S. Pat. No. 5,289, 548. This improvement takes advantage of the decomposition of the image into low frequency and difference image components. The difference image is windowed and folded before the transform is performed. When the image is restored, the image is unfolded and windowed before the blocks are added together to form the complete high frequency image. When the high frequency difference image is added to the low frequency image, the resulting reconstructed image has very high quality with no mechanism for generating edge effects associated with blocking artifacts associated with JPEG compression.

The technique that has been described above may be used to process images other than radiological images, and is not limited in this respect. The data that is processed may be any type of image, including one dimensional data such as a voice signal derived from a microphone, for example. Further, the transform that is used in the present invention is not limited to a cosine transform, and other transforms may be used. For example, in a modified form, a Fourier transform has the same properties as the cosine transform, and image or voice data may be windowed and wrapped to form a block that can be processed with a fast Fourier transform, well known in the field.

Thus, image compression apparatus and methods that that completely remove blocking artifacts from compressed and restored images and that use a lapped cosine transform to smoothly combine adjacent blocks of the image has been disclosed. It is to be understood that the described embodiment is merely illustrative of some of the many specific embodiments which represent applications of the principles of the present invention. Clearly, numerous and other arrangements can be readily devised by those skilled in the art without departing from the scope of the invention.

What is claimed is:

1. Apparatus for compressing digitized data corresponding to an image, said apparatus comprising:

smooth discrete cosine transform and wrapping means for processing the digitized data to produce a set of transform coefficients, and for folding the transform coefficients to form an image that is the same size as the image corresponding to the digitized data;

discrete cosine transform means for discrete cosine transforming the coefficients produced by the smooth discrete cosine transform and wrapping means;

quantizing means for quantizing the discrete cosine transformed coefficients produced by the discrete cosine transform means; and first encoding means for encoding the transformed and quantized coefficients to provide compressed digitized data comprising a compressed image.

2. The apparatus of claim 1 further comprising:

downsample filter means for downsampling the digitized data based on a low frequency component thereof to form low pass filtered data;

interpolator means for restoring the low pass filtered data; a summing device for subtracting the restored data from the digitized data to produce difference data;

a differential processor for quantizing the low pass filtered data; and second encoding means for encoding the quantized low pass filtered data to produce compressed digitized data.

3. The apparatus of claim 1 wherein the digitized data comprises a digitized image.

4. The apparatus of claim 1 further comprising apparatus for decompressing the compressed image that comprises:

decoding means for processing the compressed data to provide decoded data;

inverse quantizing means for processing the decoded data to provide wrapped high frequency data;

unwrapping and smooth discrete cosine transform means for processing the wrapped high frequency data to unwrap folded transform coefficients thereof and to form decompressed digitized data.

5. Apparatus for compressing a digitized image comprising a high frequency component and a low frequency component, said apparatus comprising:

downsample filter means for downsampling the image based on the low frequency component of the image to form a low pass filtered image;

interpolator means for restoring the low pass filtered image;

a summing device for subtracting the restored image from the image to produce a difference image that comprises a high frequency image;

smooth discrete cosine transform and wrapping means for transforming the difference image to produce a set of transform coefficients, and for folding the transformed difference image to form an image that is the same size as the digitized image;

discrete cosine transform means for discrete cosine transforming the coefficients produced by the smooth discrete cosine transform and wrapping means;

quantizing means for quantizing the discrete cosine transformed coefficients produced by the discrete cosine transform means;

first encoding means for encoding the transformed and quantized coefficients;

a differential processor for quantizing the low pass filtered image; and second encoding means for encoding the quantized low pass filtered image;

wherein the encoded outputs of the first and second encoding means comprise an encoded image.

6. The apparatus of claim 5 further comprising apparatus for decompressing the compressed image that comprises:

decoding means for processing the compressed image to provide decoded image;

inverse quantizing means for processing the decoded image to provide wrapped high frequency image;

unwrapping and smooth discrete cosine transform means for processing the wrapped high frequency image to unwrap folded transform coefficients thereof and to form a decompressed digitized image corresponding to the original digitized image.

7. A method for processing digitized data corresponding to an image, said method comprising the steps of:

processing the digitized data using a smooth discrete cosine transform to produce a set of transform coefficients;

folding the transform coefficients produced by the smooth discrete cosine transform processing step to provide data that is the same size as the image corresponding to the digitized data;

transforming the coefficients produced by the smooth discrete cosine transform processing and folding steps using a discrete cosine transform;

quantizing the discrete cosine transformed coefficients; and encoding the transformed and quantized coefficients to produce compressed digitized data comprising a compressed image.

8. The method of claim 7 further comprising the steps of:

decoding the compressed data in a first decoder to produce decoded data;

inverse quantizing the decoded data to restore the quantization of the frequency coefficients of the discrete cosine transform;

transforming discrete cosine transform blocks of the compressed data using an inverse discrete cosine transform to produce wrapped data; and unwrapping and smooth discrete cosine transforming the wrapped data to unwrap the folded transform coefficients and to provide the digitized data.

9. The method of claim 7 further comprising the steps of:

downsampling the digitized data based on a low frequency component thereof to form low pass filtered data;

interpolating the low pass filtered data to restore the low pass filtered data;

subtracting the restored data from the digitized data to produce difference data;

quantizing the low pass filtered data; and encoding the quantized low pass filtered data to produce compressed digitized data.

10. A method for processing a digitized image comprising a high frequency component and a low frequency component, said method comprising the steps of:

processing the digitized image using a smooth discrete cosine transform to produce a set of transform coefficients;

folding the transform coefficients produced by the smooth discrete cosine transform processing step to form an image that is the same size as the digitized image;

transforming the coefficients produced by the smooth discrete cosine transform processing and folding steps using a discrete cosine transform;

quantizing the discrete cosine transformed coefficients; and encoding the transformed and quantized coefficients to produce a compressed digitized image.

11. The method of claim 10 further comprising the steps of:

downsampling the digitized image based on the low frequency component of the image to form a low pass filtered image;

interpolating the low pass filtered image to restore the low pass filtered image;

subtracting the restored image from the digitized image to produce a difference image;

quantizing the low pass filtered image; and encoding the quantized low pass filtered image to produce a compressed digitized image.

12. The method of claim 10 further comprising the steps of:

decoding the compressed image to produce a decoded image;

inverse quantizing the decoded image to restore quantization of the frequency coefficients of the discrete cosine transform;

transforming discrete cosine transform blocks of the compressed image using an inverse discrete cosine transform to restore image components thereof and to produce wrapped pixel values for high frequency components of the image; and unwrapping and smooth discrete cosine transforming the wrapped high frequency image to unwrap the folded transform coefficients and to form a digitized image.

* * * * *